United States Patent
Xia et al.

(10) Patent No.: US 6,500,935 B2
(45) Date of Patent: Dec. 31, 2002

(54) AROMATIC BIS-ACETOACETAMIDE INTERMEDIATES

(75) Inventors: Jusong Xia, Moore, SC (US); John W. Miley, Campobello, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/994,085

(22) Filed: Nov. 21, 2001

(65) Prior Publication Data

US 2002/0107371 A1 Aug. 8, 2002

Related U.S. Application Data

(60) Provisional application No. 60/253,755, filed on Nov. 29, 2000.

(51) Int. Cl.⁷ .................. C09B 33/153; C07C 235/80; C07C 317/14
(52) U.S. Cl. ................ 534/745; 564/154; 564/155
(58) Field of Search .................. 534/745; 564/154, 564/155

(56) References Cited

U.S. PATENT DOCUMENTS

| | | | |
|---|---|---|---|
| 4,103,092 A | 7/1978 | Jefferies et al. | ............. 260/175 |
| 4,146,558 A | 3/1979 | Jefferies et al. | ............. 260/562 |
| 4,206,144 A | 6/1980 | Jefferies et al. | ............. 260/567.6 |
| 4,754,021 A | * 6/1988 | Mockli | ............. 534/605 |
| 5,559,216 A | 9/1996 | Jung et al. | ............. 534/579 |
| 5,616,778 A | 4/1997 | Goldmann et al. | ............. 560/35 |
| 5,889,162 A | 3/1999 | Hays | ............. 534/581 |

FOREIGN PATENT DOCUMENTS

| | | | |
|---|---|---|---|
| DE | 26 33 292 | | 7/1976 |
| DE | 35 01 199 | | 1/1985 |
| JP | 45-000069 | * | 1/1970 |

OTHER PUBLICATIONS

Chemical Abstracts, 73:57132, 1970.*
Moeckli, Chemical Abstracts, 106:6405, 1987.*
Kleine et al., Chemical Abstracts, 188:214883, 1993.*
Shibata et al., Chemical Abstracts, 118:222798, 1993.*
Yamada et al., Chemical Abstracts, 72:134132, 1970.*
Zhenyi et al., Dyes and Pigments, 1994, 25(3), 241–248.*

* cited by examiner

*Primary Examiner*—Flona T. Powers
(74) *Attorney, Agent, or Firm*—Terry T. Moyer; William S. Parks

(57) ABSTRACT

Specific novel compounds of aromatic bis-acetoamide structures are provided as intermediate compounds to forming different types of coloring agents, at least. Such compounds are useful as intermediates in the production of certain bis-acetoanilide azo dyes, pigments, and polymeric colorants. Such compounds facilitate production of such coloring agents that exhibit favorable tinctorial strength and intense color from orange to greenish yellow within and on different substrates and media. Coloring agents and methods of making such agents are encompassed within this invention as well.

3 Claims, No Drawings

AROMATIC BIS-ACETOACETAMIDE INTERMEDIATES

CROSS REFERENCE TO RELATED APPLICATIONS

This application is based upon provisional application No. 60/253,755 filed on Nov. 29, 2000.

FIELD OF THE INVENTION

This invention relates to specific novel compounds of aromatic bis-acetoamide structures. Such compounds are useful as intermediates in the production of certain bis-acetoanilide azo dyes, pigments, and polymeric colorants. Such compounds facilitate production of such coloring agents that exhibit favorable tinctorial strength and intense color from orange to greenish yellow within and on different substrates and media. Coloring agents and methods of making such agents are encompassed within this invention as well.

DISCUSSION OF THE PRIOR ART

All U.S. patents cited within this specification are hereby incorporated by reference.

Bis-acetoacetanilide azo yellow and orange pigments, dyes, and dyestuffs are well known and are commonly used in various types of printing inks. They also generally provide effective coloration to certain substrates, such as plastics, paints, textiles, and the like. Such coloring agents provide acceptable colorations; however, the versatility of such coloring agents within and on different media and substrates has been rather limited. Such limits have been noticeable due to a limit on the number and types of different bis-acetoacetanilide coloring agents available from the low number of known and utilized bis-acetoacetamide intermediates within the industry. Furthermore, such coloring agents have exhibited toxicity problems primarily due to the specific bridging groups between the two acetoacetamide moieties of such traditional intermediates. Such toxicity issues are basically related to the decomposition by-products of traditional bis-acetoacetanilide, and the like, coloring agents, particularly in plastic applications, and are rising concerns to consumers. For example, Pigment Yellow 17 (structure below) is a strong greenish-shade bis-acetoacetanilide yellow and has often been incorporated within plastics.

Pigment Yellow 17

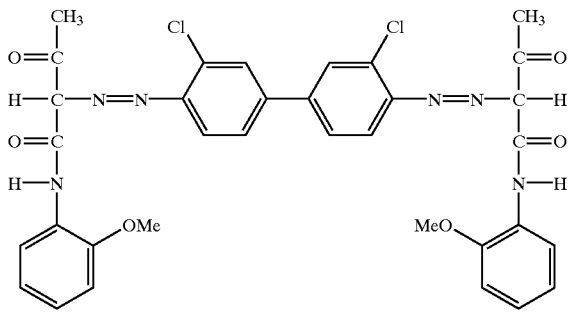

However, as reported by R. Az et al in *Dyes and pigments*, 15, 1 (1991), such a coloring agent degrades into potentially carcinogenic by-products (e.g. 3,3'-dichlorobenzidine) in plastics processed above 200° C., a temperature lower than that used in processing most plastics (e.g., from about 230° C. to about 330° C.). In efforts to overcome these disadvantages, azo pigment manufacturers have actively pursued development of other types of bis-acetoacetaninde colors by using various intermediates.

Alternative pigments have been developed by coupling diacetoacet-1,4-phenylenediamide with aniline derivatives. For example, U.S. Pat. No. 5,616,778 discloses coupling diacetoacet-1,4-phenylenediamide with 2,5-dicarbomethoxyaniline to produce Pigment Yellow 155 (structure below). As another example, U.S. Pat. No. 5,559, 216 discloses 47 different examples of coupling diacetoacet-1,4-phenylenediamide with various aniline derivatives and describes the related processes for making such bis-acetoacetanilide pigments. Other examples of such alternatives include the following patents: German Patent 3,501, 199, Canadian Patent 1,135,688, and U.S. Pat. Nos. 5,889, 162, 4,146,558, and 4,103,092.

Pigment Yellow 155

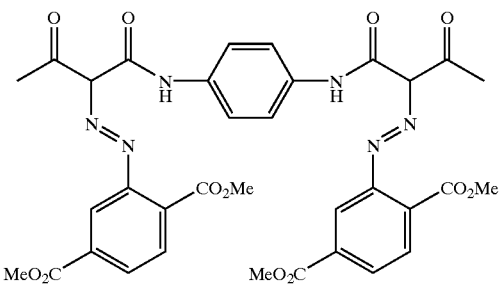

Very few reports exist in the pertinent literature regarding the coupling of such alternative bis-acetoacetamide starting materials with 4,4'-bi-o-acetoacetotoluidine (Naphthol AS-G) into anilines to another type of Bis-AAA colorants. U.S. Pat. Nos. 4,146,558 and 4,206,144 describe a process to make a water-soluble bright yellow dyestuff having the formula

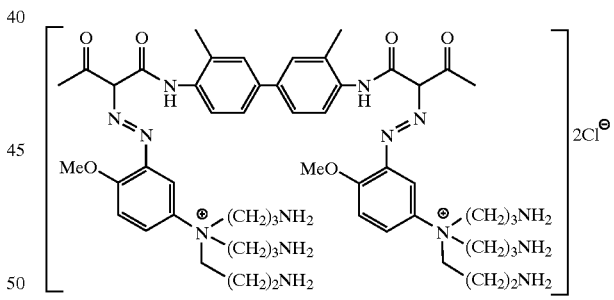

Such biphenyl bridged coloring agents, however, exhibit toxicity which limits its use to certain products.

As noted above, there is still a noticeable need to develop new intermediates to synthesize new bis-acetoanilide azo coloring agents, to meet various coloration needs in diversified commercial market requirements, such as toxicity, brightness, strength and the like. Hence, there still exists a need to develop a method, and well as possible intermediate compounds, which facilitate production of such bis-acetoanilide azo coloring agents.

DESCRIPTION OF THE INVENTION

It is thus an object of the invention to provide a novel method of producing such desirable bis-acetoacetanilide coloring agents through the reaction of a novel bis-acetoacetamide intermediate with any number of amine groups. Another object of this invention is to provide a novel bis-acetoacetamide intermediate compound.

It is to be understood that the term alkyl as used throughout is intended to encompass any straight or branched alkyl moiety, having anywhere from 1 to 30 carbons therein; the same chain length applies to the term "alkoxy" as well. Also, the term substitued phenyl is intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The present invention preferably encompasses the utilization of and the compound of Formula (I)

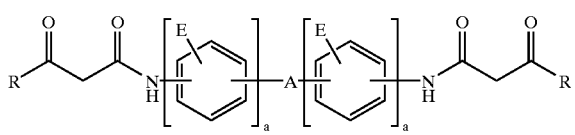

(I)

wherein R is alkyl, phenyl, polyphenyl, or substituted phenyl; E is H, halogen, alkyl, alkoxy, or phenyl; and a is 1 or 2, wherein if a is 1, then A is O, $SO_2N$, methylene, S, N(R') or a moiety of Structure (II)

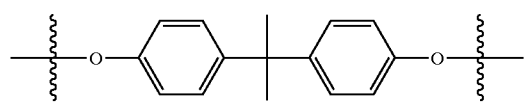

(II)

wherein R' is alkyl or hydrogen, and if a is 2, then A is O, $SO_2$, methylene, S, N(R'), wherein R' is alkyl or hydrogen.

Such an intermediate is thus utilized as a reactant with any number of amine-containing compounds to form bis-acetoacetanilide azo coloring agents. It is intended that the term "coloring agent" encompasses any color-producing or -exhibiting compound including, without limitation, dyes, pigments, polymeric colorants, dyestuffs, and the like. Basically, any bis-acetoacetanilide color-producing or -exhibiting compound falls within such definition.

In order to produce such coloring agents, the aforementioned novel intermediate must be reacted with an amine, particularly in a 1:2 molar ratio to produce the necessary two azo groups to provide the desired colorations. To produce a bis-acetoacetanilide pigment, dye, or dyestuff, the inventive intermediate is reacted with any number of aniline derivatives. The production of a pigment or dye is dependent primarily upon the types of pendant groups present on such aniline derivatives. Other amine compounds may be utilized as reactants as long as azo groups result from such reaction and thus produces a coloring agent. Also, the molar ratio of the intermediate in relation to amine may be anywhere from about 1:0.1 to about 1:3, depending on the degree of azotization desired. Preferably, again, this ratio is 1:2 intermediate to amine.

DESCRIPTION OF THE PREFERRED EMBODIMENT

The specific formulations below, as well as the following exemplified methods of producing such and methods of coloring using such are thus indicative of the preferred embodiments of this invention:

Intermediate Formation

EXAMPLE 1

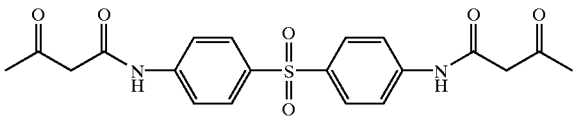

A mixture of 4,4'-diaminodiphenyl sulfone (12.4 g, 50 mmol), ethyl acetoacetate (14.5 g, 111 mmol), 2-hydroxypyridine (0.4 g) and para-Xylene (20 ml) was stirred under refluxing for 4 hours. Upon being cooled and stayed at room temperature overnight, the precipitate was collected by filtration and washed twice with cold ethanol and dried. 19.5 g (93.5%) of product bis(acetoacetanilide)-p-sulfone (structure above) was obtained as a yellow solid (mp 252–260C), which was used as a starting material without further purification.

EXAMPLE 2

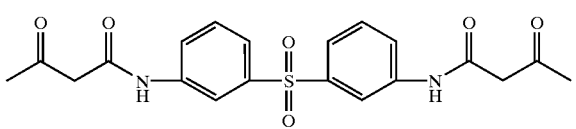

A mixture consisting of 3,3'-diaminodiphenyl sulfone (12.4 g, 50 mmol), ethyl acetoacetate (20 g, 150 mmol), copper powder (0.3 g) and para-Xylene (20 ml) was stirred under refluxing for 4 hours. Upon being cooled and stayed at room temperature overnight, 19 g (91.3%) of product bis(acetoacetanilide)-m-sulfone (structure above) was obtained as a light yellow semi-solid which was used as a starting material without further purification. Infrared analysis of the product showed no ester peak (1730 cm-1) contained in the product.

EXAMPLE 3

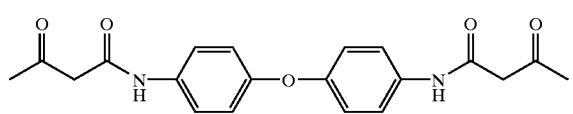

To a 250-ml 3-neck equipped with thermometer and distillation condenser, were charged p-xylene and a mixture of triethanolamine (0.75 g, 5 mmol) in ethanol (1.5 ml). The reaction was heated to boiling until 13 ml of ethanol/p-xylene mixture was distilled off. After being cooled to room temperature, 4,4'-oxydianiline (10 g, 50 mmol) was added to the reaction, and the resulting mixture was heated to reflux. At this temperature, a solution of methyl acetoacetate (18 g, 155 mmol) in p-xylene (20 ml) was introduced dropwise to the reaction in 1 hour while the mixture of methanol/p-xylene was distilled off. After completion of the addition, another portion of p-xylene (50 ml) was added. In the end, 100 ml of distillate was collected. Upon being cooled to room temperature, the precipitate was collected by filtration and boiled with ethanol (50 ml). After being cooled to room temperature, the precipitate thus formed collected and dried in a 50C oven overnight, yielding 18 g (97.8%) of product 4,4'-oxy-bis(acetoacetanilide) (structure above) as a light yellow solid (mp 178–182C), which was then used to make coloring agents without further purification.

EXAMPLE 4

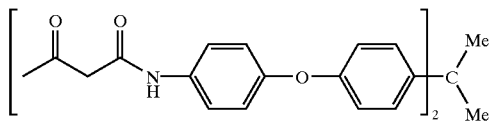

Following the procedure described in Example 11, 2,2'-bis[4-(4-aminophenoxy)phenyl]-propane (BAPP, 20.5 g, 50 mmol) was reacted with methyl acetoacetate (18 g, 155 mmol) in p-xylene in the presence of triethanolamine (0.75 g, 5 mmol), to give 25 g (86.5%) of product Bis (acetoacetanilide)-BAPP (structure above) as a light yellow semi-solid. This crude product was used as a starting material without further purification.

Coloring Agent Formation

These intermediates were then reacted with amines to produce coloring agents of different types. The following non-limiting examples show the methods followed for such reactions:

EXAMPLE 5

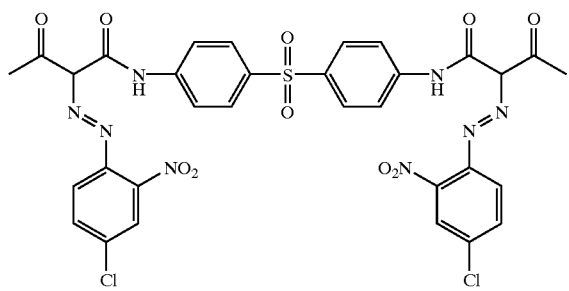

To a 250 ml flask, were charged water (40 ml), hydrochloric acid (10.5 ml, 124 mmol) and 4-chloro-2-nitroaniline (9.36 g, 54.2 mmol). The mixture was stirred for 15 min and cooled down to 0C by an ice bath. A solution of NaNO2 (8 g, 115 mmol) in 20 ml of water was slowly added while stirring and maintaining the temperature below 5C. After completion of the addition, sulfamic acid (6 g) was carefully added until no excess of HNO2 was detected by starch-$I_2$ paper, and the resulting mixture was stirred at 0–5C for 30 min.

To another 500 ml flask were charged caustic (6.5 g), a 40% aqueous EDTA, tetrasodium salt (7 g), water (40 ml) and bis(acetoacetanilide)-p-sulfone (11.3 g, 27.1 mmol, from Example 1), and the mixture was stirred for 15 min and cooled down to 5 –10C. The above diazo solution was slowly introduced into this bis(acetoacetanilide)-p-sulfone solution while maintaining the temperature at below 15C, and the pH was maintained at 9–10 by adding HCl or caustic. The resulting mixture was post-stirred for 1 hr at 10–15C, and then left stirring at RT overnight. The precipitate formed was collected by filtration and the filtercake was washed several times with water and dried at an 70C oven, to give 15 g of orange-yellow powder (structure above).

EXAMPLE 6

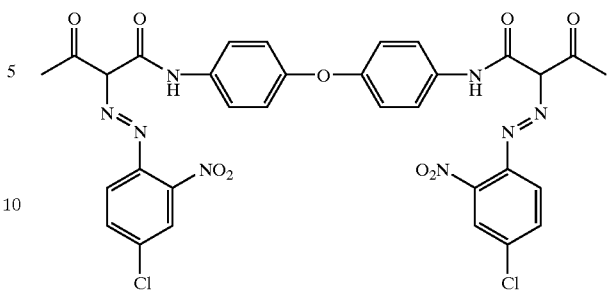

Following the procedure described in Example 5, 4-chloro-2-nitroaniline (9.36 g, 54.2 mmol) was diazotised and coupled with 4,4'-oxy-bis(acetoacetanilide) (10 g, 27.1 mmol, from Example 3). Upon being washed and dried, 15.8 g of greenish yellow powder was obtained (structure above).

EXAMPLE 7

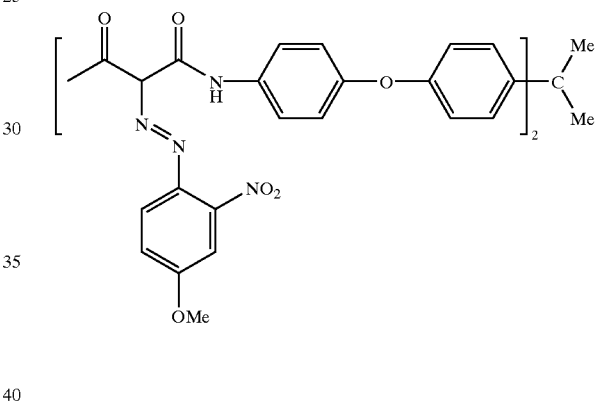

Following the procedure described in Example 5, 4-methoxy-2-nitroaniline (9.12 g, 54.2 mmol) was diazotised and coupled with bis(acetoacetanilide)-BAPP (16 g, 27.1 mmol, from Example 4). Upon being washed and dried, 18.8 g of reddish orange solid was obtained (structure above).

There are, of course, many alternative embodiments and modifications of the present invention which are intended to be included within the spirit and scope of this invention.

What we claim is:

1. The compound conforming to the structure of Formula (I)

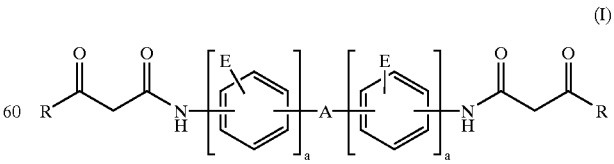

wherein R is alkyl, phenyl, polyphenyl, or substituted phenyl; E is H, halogen, alkyl, alkoxy, or phenyl; and a is 1 or 2, wherein if a is 1, then A is a moiety of Structure (II)

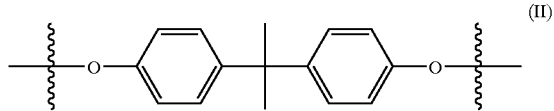

(II)

wherein R' is alkyl or hydrogen, and if a is 2, then A is O or SO$_2$, wherein R' is alkyl or hydrogen.

2. A bisacetoanilide azo coloring agent produced through the reaction of the compound of claim 1 with at least one diazotized amine-containing compound.

3. A method of producing a bisacetoanilide azo coloring agent comprising the steps of providing at least one compound as defined in claim 1, and reacting said at least one compound with at least one diazotized amine-containing compound.

* * * * *